(12) United States Patent
Falkenstein

(10) Patent No.: US 8,720,619 B2
(45) Date of Patent: May 13, 2014

(54) METHOD FOR OPERATING A DRIVE DEVICE OF A HYBIRD VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 830 days.

(21) Appl. No.: 12/223,201

(22) PCT Filed: Jan. 30, 2007

(86) PCT No.: PCT/EP2007/050871
§ 371 (c)(1),
(2), (4) Date: Jul. 23, 2010

(87) PCT Pub. No.: WO2007/090761
PCT Pub. Date: Aug. 16, 2007

(65) Prior Publication Data
US 2010/0282532 A1 Nov. 11, 2010

(30) Foreign Application Priority Data
Feb. 10, 2006 (DE) .......................... 10 2006 006 107

(51) Int. Cl.
*B60W 20/00* (2006.01)

(52) U.S. Cl.
CPC .................................. *B60W 20/108* (2013.01)
USPC .................................. 180/65.265; 180/65.21

(58) Field of Classification Search
USPC ......................................... 180/65.21, 65.265
See application file for complete search history.

(56) References Cited

U.S. PATENT DOCUMENTS

| 5,637,987 | A * | 6/1997 | Fattic et al. ..................... 322/40 |
| 5,954,779 | A * | 9/1999 | Dietzel ............................ 701/87 |
| 6,233,508 | B1 * | 5/2001 | Deguchi et al. ................. 701/22 |
| 6,364,807 | B1 * | 4/2002 | Koneda et al. .................... 477/5 |
| 6,512,967 | B2 * | 1/2003 | Ostberg et al. .................. 701/22 |
| 6,806,667 | B1 | 10/2004 | Sasaki |
| 7,104,347 | B2 * | 9/2006 | Severinsky et al. ........ 180/65.23 |
| 7,150,698 | B2 * | 12/2006 | Sakamoto et al. ................ 477/5 |
| 7,562,732 | B2 * | 7/2009 | Zillmer et al. ............. 180/65.51 |
| 7,860,629 | B2 * | 12/2010 | Schweizer et al. ............. 701/51 |
| 2001/0032040 | A1 * | 10/2001 | Albert et al. .................... 701/22 |
| 2002/0170758 | A1 | 11/2002 | Shimabukuro |
| 2003/0062206 | A1 | 4/2003 | Fujikawa |
| 2003/0217876 | A1 * | 11/2003 | Severinsky et al. .......... 180/65.2 |
| 2005/0211479 | A1 * | 9/2005 | Tamor .......................... 180/65.2 |
| 2006/0032684 | A1 * | 2/2006 | Rayl ............................. 180/65.2 |
| 2006/0166783 | A1 * | 7/2006 | Tamai et al. ..................... 477/7 |

FOREIGN PATENT DOCUMENTS

| DE | 102 01 264 | 11/2003 |
| EP | 1 270 301 | 1/2003 |
| JP | 2003079005 | 3/2003 |
| JP | 2003-333710 | 11/2003 |
| WO | WO 2004/067949 | 8/2004 |

\* cited by examiner

*Primary Examiner* — John Walters
*Assistant Examiner* — Brian Swenson
(74) *Attorney, Agent, or Firm* — Kenyon & Kenyon LLP

(57) ABSTRACT

In a method for operating a drive device of a hybrid vehicle, in particular a hybrid motor vehicle, having at least one internal combustion engine and at least one electric machine, the torques of the internal combustion engine and the electric machine are added. A torque/torque component which, with respect to a request, is not deliverable by the internal combustion engine because of the system-related inertia of the internal combustion engine, is compensated at least partially by a torque/torque component delivered by the electric machine.

22 Claims, 5 Drawing Sheets

METHOD FOR OPERATING A DRIVE DEVICE OF A HYBIRD VEHICLE

BACKGROUND OF THE INVENTION

1. Field of the Invention

The present invention relates to a method for operating a drive device of a hybrid vehicle, in particular a hybrid motor vehicle, having at least one internal combustion engine and at least one electric machine, the torques of the internal combustion engine and electric machine being added together.

2. Description of Related Art

Methods of the kind mentioned at the outset are known. To reduce fuel consumption and emissions, the goal is an optimal distribution of the driving torque requested by the driver between the internal combustion engine and the electric machine. The driving torque is divided so that the internal combustion engine is operated in the range of favorable efficiencies and it is possible to charge an electric accumulator belonging to the electric machine. At low driving speeds, however, the internal combustion engine should be turned off and the requested torque should be applied only by the electric machine. In addition, the braking energy in braking of the vehicle may be utilized by recuperation for charging the electric accumulator. Modern gasoline engines having intake manifold injection usually have an electronic throttle valve for regulating the air flow. The accelerator pedal is then decoupled mechanically from the throttle valve. The ultimate setting speed of the throttle valve control element and dynamic charge effects in the intake manifold do not allow a highly dynamic setting of a predefined air flow and of the internal combustion engine torque thereby generated. Electric machines, however, have a much more dynamic response. If the driver requests an increased driving torque, and the internal combustion engine thereby enters ranges of favorable efficiency, the electric machine is usually controlled so that it operates more as a generator. The machines may be triggered in such a way that the negative torque having a higher absolute value coming from the electric machine, which is operated as a generator, is compensated by an increased torque of the internal combustion engine. Due to the fact that, in comparison with the internal combustion engine, the electric machine has a highly dynamic response, the actual driving torque of the vehicle initially declines before approaching the torque requested by the driver. This has a negative effect on drivability and comfort. This undershooting may under some circumstances also excite unwanted vibrations in the drivetrain. To avoid this undershooting, it would be possible to additionally apply the difference between the setpoint torque and the actual torque of the internal combustion engine to the electric machine, to thereby compensate for the delayed torque buildup by the internal combustion engine. In a dynamic style of driving, i.e., with frequent changes in driving torque requirements, the electric machine would be under a highly dynamic load. This would be associated with a highly dynamic electric power demand of the energy accumulator connected to the electric machine, resulting in a high energy conversion in the energy accumulator and shortening its lifetime. In addition, frequent cyclic charging and discharging operations result in high conversion losses, having a deleterious effect on overall efficiency.

In addition, a method for operating the drive device of a hybrid vehicle is known from published German patent document DE 102 01 264. In the case of a negative driving torque demand, the drive unit and a brake system of the hybrid vehicle are triggered in a consumption-optimized manner. The goal in this method is to optimally utilize the available energy of the hybrid vehicle. By recovering braking energy through recuperation in particular, this energy may be fed into the vehicle electrical system, thereby decreasing the fuel consumption of the internal combustion engine.

BRIEF SUMMARY OF THE INVENTION

The present invention has the advantage that a delayed change in torque produced by the inertia in the torque triggering of the internal combustion engine, e.g., due to the intake manifold dynamics or due to a "turbohole," is at least partially compensated by a torque of the electric machine. The driver is thus able to obtain the expected reproducible driving torque. Furthermore, undershooting in the acceleration procedure is also preventable in this way.

According to a refinement of the present invention, it is advantageous if, depending on the requirement, an allowed range for an actual driving torque and/or its gradient is predefined as a function of at least one parameter. In other words, when the driver requests a driving torque, an upper limit and a lower limit for the driving torque and/or its gradient are predefined as a function of this request; the actual driving torque that actually occurs and/or its gradient must not exceed this upper limit or drop below this lower limit, these limits being predefined as a function of at least one parameter that changes during the operation of the hybrid vehicle.

In a refinement of the present invention, the allowed actual torque range is predefined in such a way that vibration excitations of a drivetrain in the hybrid vehicle are prevented. This should prevent the driving torque from dropping at first when acceleration is requested by the driver due to the highly dynamic response of the electric machine, thereby resulting in so-called undershooting, which may unwantedly excite vibrations in the drivetrain. The allowed actual driving torque range is therefore predefined in such a way that a change in driving torque is possible only in the requested "direction" selected by the driver.

It is further advantageous if the performance of the electric machine is predefined within limits. This reduces conversion losses occurring during operation of the electric machine and the components belonging to it, in particular an electric accumulator.

At least one range limit of the allowed actual torque range is advantageously influenced as a function of the power of the electric machine, which is predefined within limits so as not to exceed the aforementioned conversion losses.

It is also advantageous if the electric machine supplies an additional torque contribution when the actual driving torque departs from the allowed range, so that the actual driving torque returns to the allowed range.

According to a further refinement of the present invention, the parameter determining the allowed range for the actual driving torque is a function, for example, of the cruise control and/or of the adaptive cruise control. Furthermore, the allowed actual driving torque range may also depend on the velocity and/or rotational speed. The driver may thus expect a reproducible driving torque at different velocities and/or rotational speeds. Furthermore, it is also conceivable for a signal of an ESP-ASR-ABS system to be used as a parameter for the allowed actual torque range or to allow a more or less dynamic response, depending on the driver.

DETAILED DESCRIPTION OF THE INVENTION

Figure 1:
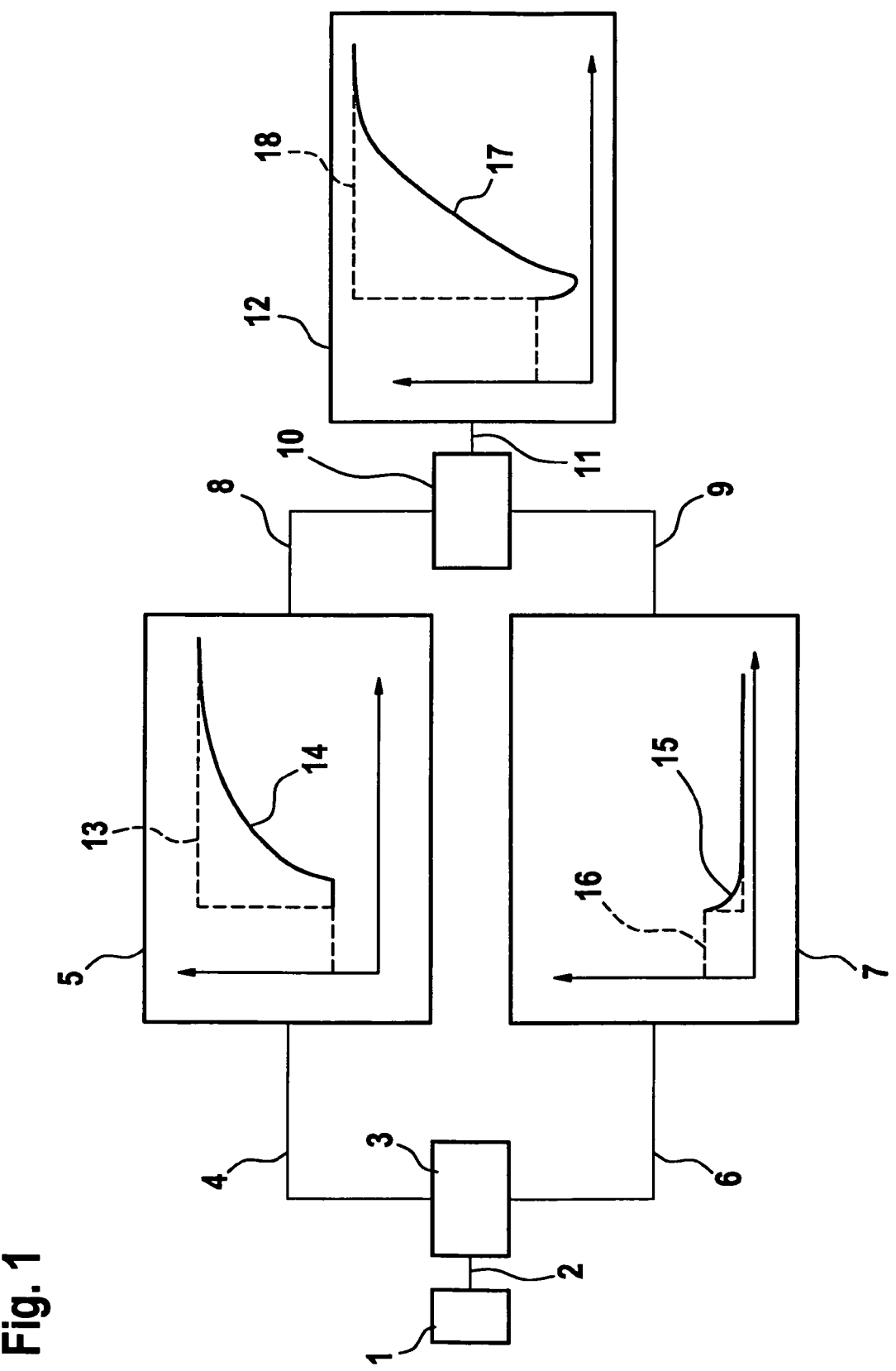
FIG. 1 shows a simulation model for the torque distribution illustrating the present invention in a parallel hybrid drivetrain.

FIG. 1 shows a simulation model for the torque distribution, illustrating the present invention in a parallel hybrid drivetrain, an element 1, a sensor here for detecting the driver's input, for example, sending a signal, in particular a setpoint driving torque, over a connection 2 to a control unit 3 of the drive device of a hybrid vehicle, from which a connection 4 leads to an internal combustion engine 5, the response of which in the case of a change in torque is characterized by a diagram, and a connection 6 leads to an electric machine 7, the response of which in the case of a change in torque is also characterized by a diagram, connections 8, 9 leading from internal combustion engine 5 and electric machine 7 to an adder 10, in which the torques of internal combustion engine 5 and electric machine 7 are added up and which has a connection 11 to an element 12, which likewise characterizes the response of the overall drivetrain by a diagram. If the driver requests a certain driving torque via the position of an operating element, in particular an accelerator pedal, this is detected by the sensors in element 1 and forwarded to control unit 3, which distributes the requested torque to internal combustion engine 5 and electric machine 7, so that when the internal combustion engine enters a range of favorable efficiencies, the electric machine is controlled to operate more as a generator. The characteristic diagram of the internal combustion engine has two torque curves plotted against time, the one curve describing setpoint torque 13 of the internal combustion engine and having a sudden change toward a higher torque and the other curve describing actual torque 14 of the internal combustion engine. Due to the inertia in torque triggering of internal combustion engine 5, actual torque 14 of the internal combustion engine responds with a time lag and only asymptotically approaches setpoint torque 13 of the internal combustion engine.

The highly dynamic response characteristic of electric machine 7 depicted in the characteristic diagram of electric machine 7 produces a rapid asymptotic approach of actual torque 15 of the electric machine to a sudden change in setpoint torque 16 of the electric machine.

The total of the actual torques of internal combustion engine 5 and electric machine 7 produces the response of the overall drivetrain represented in element 12. The total of setpoint torque 13 of the internal combustion engine and setpoint torque 16 of the electric machine corresponds to setpoint torque 18 requested by the driver. With an increase in setpoint torque 18 requested by the driver, internal combustion engine 5 enters a range of more favorable efficiencies, and electric machine 7 goes into generator operation to a greater extent, thereby increasing the charging capacity for an electric accumulator connected thereto. To compensate for the higher load of electric machine 7, setpoint torque 13 of the internal combustion engine changes suddenly to a higher level. Due to the highly dynamic response characteristic of electric machine 7, the so-called undershooting of actual driving torque 17 occurs, i.e., the actual driving torque declines at first, and only then asymptotically approaches setpoint driving torque 18.

Figure 2:
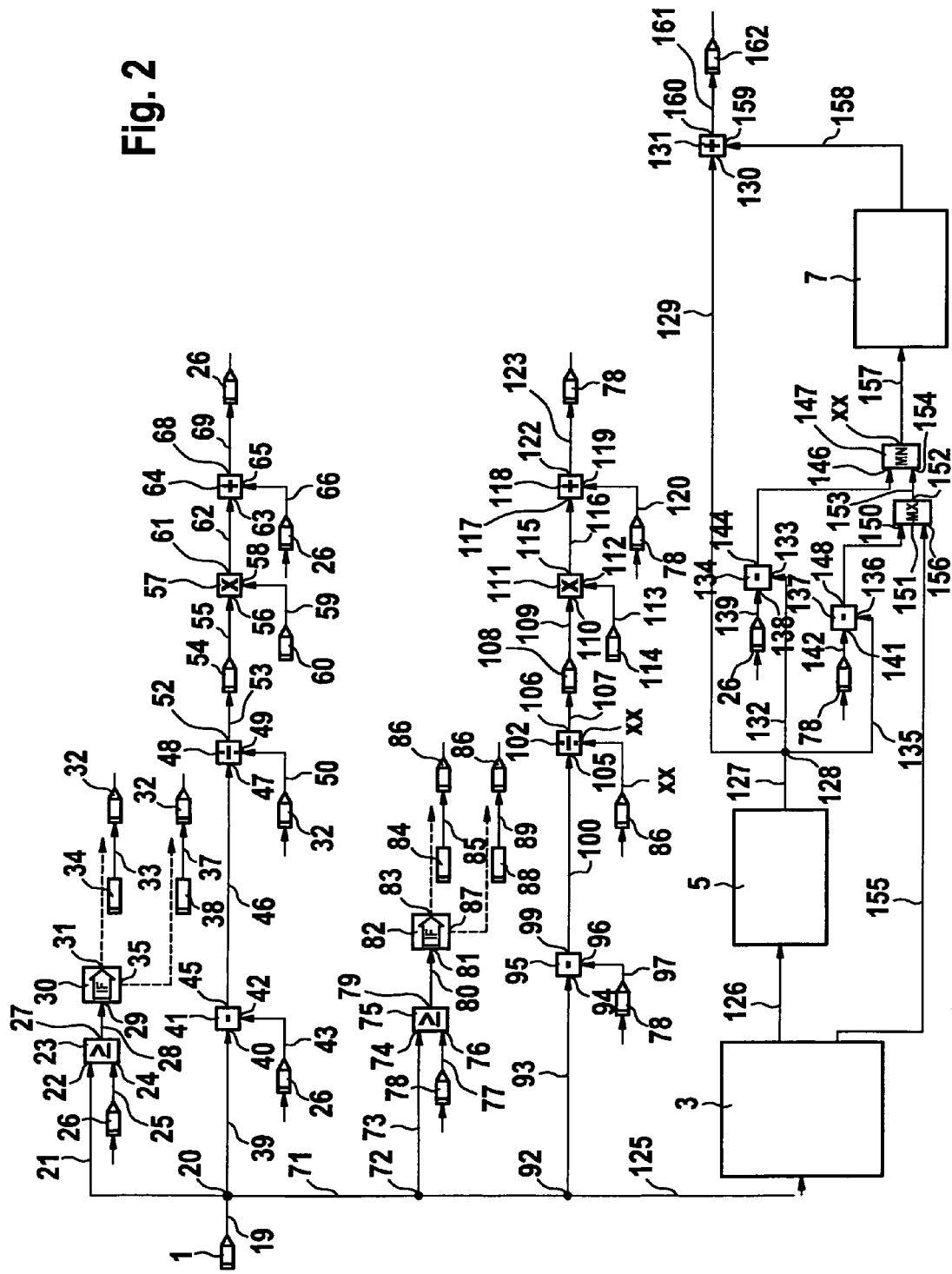
FIG. 2 shows a simulation model of an exemplary embodiment of the present invention with a limitation of the allowed range by absolute limits.

FIG. 2 shows an exemplary embodiment of the present invention using the example of a parallel hybrid, in which the allowed actual driving torque range is limited by absolute limits (trqLimHi and trqLimLo), which result from setpoint torque 18 via PT1 response. A calculation procedure that is processed cyclically in the sense of a sampling system at individual sampling increments is shown. A few values calculated in a previous sampling step and then stored are used to calculate valid values for the instantaneous sampling step. Element 1 from FIG. 1 is shown; it sends a setpoint driving torque 18 (trqDes) requested by the driver in the upper area of FIG. 2 over a connection 19 to a node 20, from which a connection 21 leads to an input 22 of an operator 23, which performs a greater than/equal to comparison of two values and forwards the result as output quantity true or false. Over a second input 24 of operator 23, the latter receives as the second value an upper limit value 26 (trqLimHi) calculated in the previous sampling step as the second value for the allowed range of actual driving torque 17 over a connection 25. A connection 28 goes from an output 27 of operator 23 to an input 29 of IF circuit 30, which has an output 31 to which is allocated a time constant 32 (TPT1Hi), which is determined from a value 34 (TPT1_Fast) via a connection 33, and to an output 35, to which is in turn allocated time constant 32 (TPT1Hi), which is determined from a value 38 (TPT1_Slow) via a connection 37. Depending on whether the value coming from operator 23 is true or false and/or whether setpoint driving torque 18 is greater than/equal to or less than upper limit 26, a different value is allocated to time constant 32 (TPT1Hi) by IF circuit 30.

Another connection 39 leads from node 20 to an input 40 of a subtractor 41, having a second input 42, to which is allocated, via a connection 43, upper limit value 26 (trqLimHi) as a subtrahend calculated in the previous sampling step. From an output 45 of subtractor 41, a connection 46 leads to an input 47 of a divider 48, to which is allocated at another input 49, via a connection 50, a time constant 32 (TPT1Hi) calculated previously as a divisor. From an output 52 of divider 48, an output quantity is sent via a connection 53 to an element 54, from which a connection 55 leads to an input 56 of a multiplier 57, to which is allocated another quantity 60 (dT) at its input 58 via a connection 59. The value of additional quantity 60 (dT) corresponds to the sampling time (sampling period, time between two sampling steps).

A connection 62 leads from an output 61 to an input 63 of an adder 64, to which is allocated upper limit 26 (trqLimHi) calculated in the previous sampling step (and then stored) at another input 65 via a connection 66 and which outputs upper limit value 26 (trqLimHi) calculated for the present sampling step at an output 68 via connection 69. The calculation procedure described corresponds to implementation of a time-delay element of the first order as a sampling system; when considered continuously, the following applies to upper limit value 26 (trqLimHi):

$$TPT1Hi \cdot d(trqLimHi)/dt + trgLimHi = trqDes.$$

Time constant TPT1Hi is selected differently by the IF circuit with positive and negative gradients of trqLimHi, where it holds that:

$$TPT1Hi = TPT1\_\text{Fast if } trqDes \geq trqLimHi$$

$$TPT1Hi = TPT1\_\text{Slow if } trqDes < trqLimHi.$$

With TPT1_Slow>TPT1_Fast, a rapid rise and a slow decline in the upper limit (trqLimHi) are achieved. The lower limit behaves conversely with a rapid decline and a slow rise. Parameterization as a function of the operating state of the drivetrain is advantageous here.

The middle part of FIG. 2 shows a calculation procedure for ascertaining a lower limit 78 (trqLimLo). The calculation procedure equals that of upper limit 26 (trqLimHi), where the elements shown that have the same function are provided with the same reference numerals.

The calculation formulas differ in that values 38 (TPT1_Slow) and 34 (TPT1_Fast) of time constant 86 (TPT1Lo) are selected in the opposite way, as mentioned above:

$$TPT1Lo=TPT1\_Slow \text{ if } trqDes \geq trqLimLo,$$

$$TPT1Lo=TPT1\_Fast \text{ if } trqDes < trqLimLo,$$

the part for determining time constant 86 being connected to a node 72, which has a connection 71 to node 20, and another connection 91 to a node 92, from which a connection 93 leads for calculation of lower limit 78 (trqLimLo).

Another connection 125 leads from node 92 to control unit 3, which is known from FIG. 1, and from which a connection 126 leads to internal combustion engine 5. This connection 126 transmits actual torque 14 of the internal combustion engine via a connection 127 to a node 128, from which a connection 129 leads to an input 130 of an adder 131, and a connection 132 leads to an input 133 of a subtractor 134, and a connection 135 leads to an input 136 of a subtractor 137, the value for upper limit 26 (trqLimHi) calculated for the present sampling step in the upper area being introduced as the minuend via a connection 139 through another input 138 of subtractor 134, and the value calculated for lower limit 78 (trqLimLo) for the present sampling step in the middle area of FIG. 2 being also introduced as the minuend at an input 141 of subtractor 137 via a connection 142.

A connection 145 leads from an output 144 of subtractor 134 to an input 146 of element 147, which compares two values and forwards the smaller value. A connection 149 leads from an output 148 of subtractor 137 to an input 150 of element 151, which compares two values and forwards the larger value to an input 154 of element 147 via a connection 153. Furthermore, the setpoint torque of electric machine 7 is supplied via a connection 155 from control unit 3 to an input 156 of element 151. Thus, by subtraction of the actual torque of the internal combustion engine from limits 26 and 78, this yields limits for setpoint torque 16 of electric machine 7.

In addition, a connection 157 leads to electric machine 7, from which another connection 158 leads to an input 159 of adder 131, in which the torques of the drive units are added to form actual driving torque 162 available at output 160.

Figure 3:
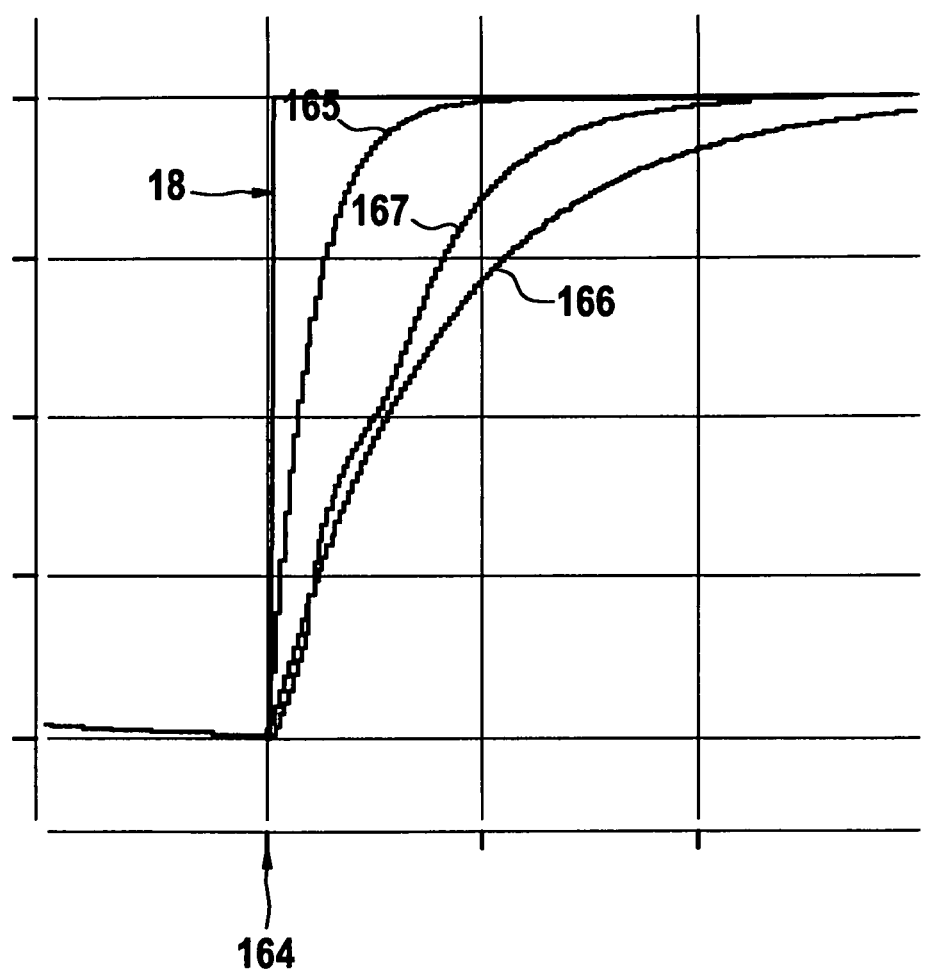
FIG. 3 shows the response of the absolute limits and the actual total torque on a sudden change in the total setpoint torque.

FIG. 3 shows a diagram of the response of the limits ascertained from FIG. 2 for the allowed range of actual driving torque 162 to a sudden change in setpoint driving torque 18, the torque being plotted as a function of time (abscissa) on the coordinate. Four curves are plotted in the diagram, one curve representing setpoint driving torque 18 running parallel to the abscissa at a constant level initially, then rising to a higher value almost perpendicular/parallel to the ordinate at a point in time 164 and then again running parallel to the abscissa at a constant value. Another curve 165 represents upper limit 26 and initially runs parallel to setpoint driving torque 18, then rises steeply after point in time 164, next asymptotically approaching setpoint driving torque 18. A third curve 166 representing lower limit 78 for the allowed range of actual driving torque 162 initially runs at the same level as setpoint driving torque 18 and curve 165, then rises steeply after point in time 164, but remains definitely below curve 165 and approaches setpoint driving torque 18 much more slowly. Fourth curve 167 representing actual driving torque 162 rises steeply after point in time 164, but then initially remains below curve 166, but intersects it thereafter and remains between curves 165 and 166, likewise asymptotically approaching setpoint driving torque 18. Thus if setpoint driving torque 18 changes, e.g., when the driver operates the accelerator pedal, initially the upper limit (curve 165) and lower limit (curve 166) of the allowed actual driving torque range are calculated according to the exemplary embodiment from FIG. 2. Actual driving torque 162 initially follows the lower limit (curve 166), resulting in a slight, noncritical deviation from the lower limit (curve 166) due to the PT1 response in the torque regulation of electric machine 7. Since actual driving torque 162 is between upper limit 26 and lower limit 78, i.e., within the allowed range, there is no additional intervention in the torque of electric machine 7, so the electric power defined by control unit 3 from FIG. 2 is maintained, which has a positive effect on the energy accumulator.

Figure 4:
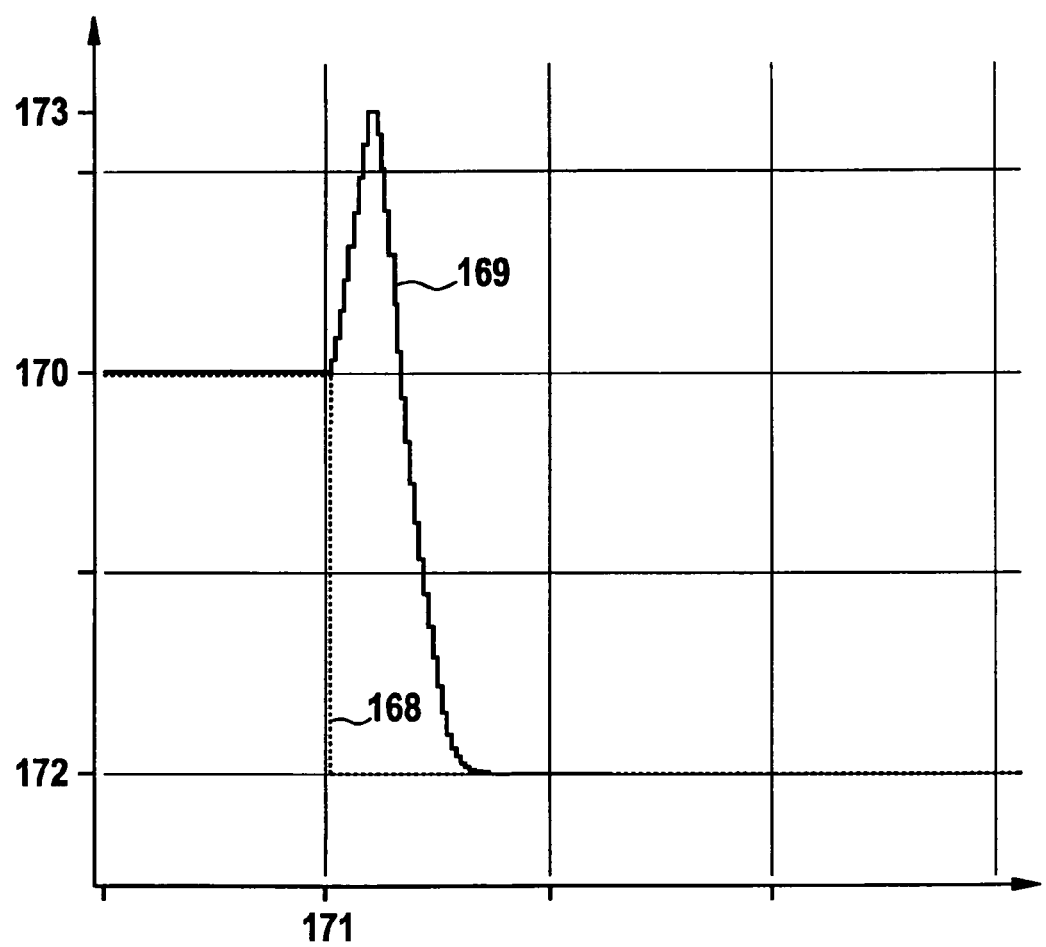
FIG. 4 shows the response of the actual torque of the electric machine to a sudden change in the unlimited setpoint torque of the electric machine.

The intervention in the torque of electric machine 7 is represented in a diagram in FIG. 4. A setpoint torque 168 defined by control unit 3 from FIG. 2 and an actual torque 169 of the electric machine are plotted against time. First setpoint torque and actual torque 168, 169 run at a constant level 170. At a point in time 171, the setpoint torque changes suddenly to a lower level 172. Actual torque 169 of the electric machine initially increases steeply to a higher level 173 and then drops steeply, to then asymptotically approach setpoint torque 168. With an increase in setpoint driving torque 18, setpoint torque 168 of the electric machine defined by control unit 3 from FIG. 2 drops to a low level, so that the electric machine operates more as a generator. However, in order not to depart from the allowed actual driving torque range, according to the exemplary embodiment in FIG. 2 the control unit intervenes in the torque of the electric machine so that the delayed torque buildup of the internal combustion engine is compensated.

Figure 5:
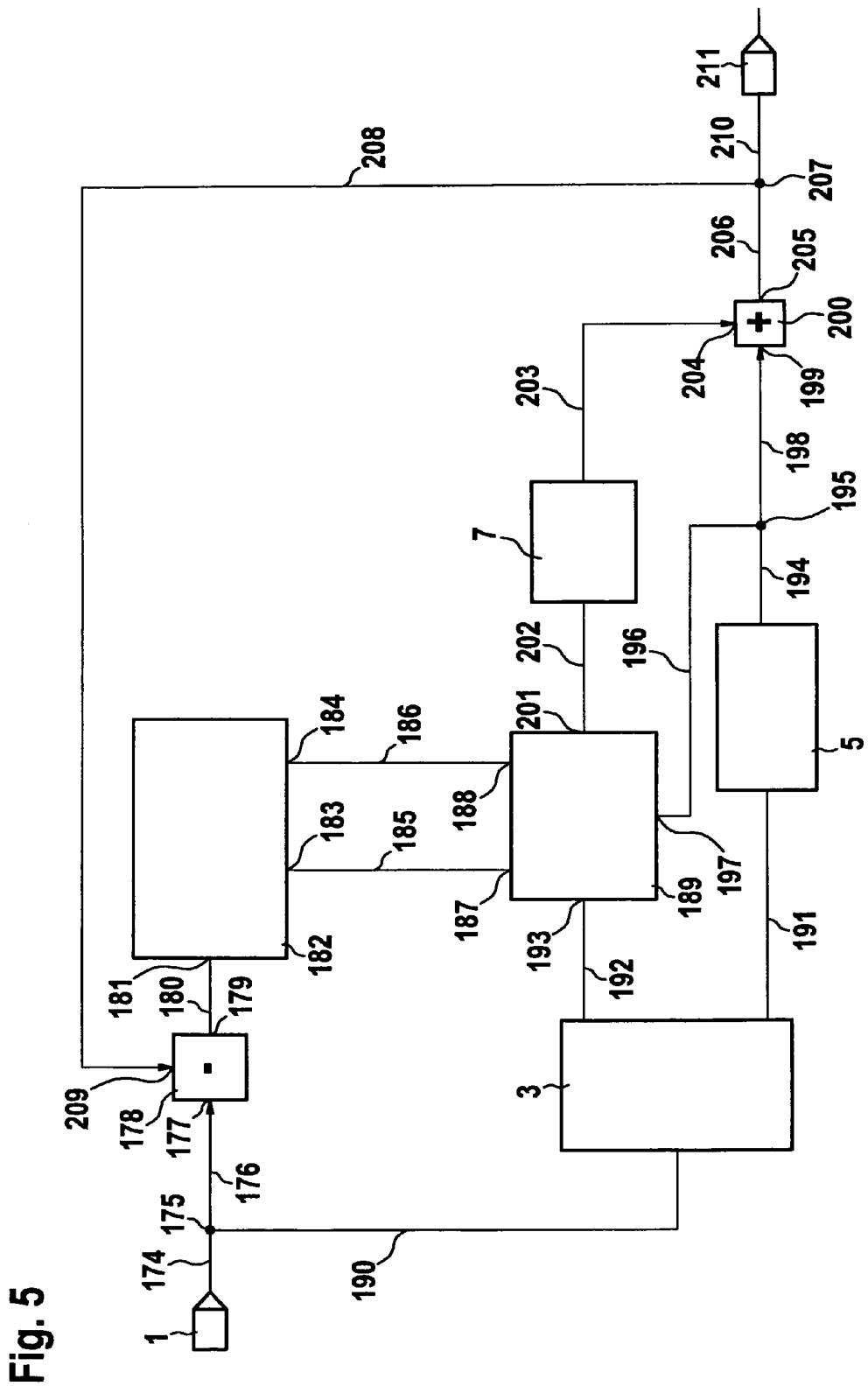
FIG. 5 shows a simulation model of an exemplary embodiment of the present invention with a limitation of the allowed range by limits for the gradient of the actual total torque.

FIG. 5 shows another exemplary embodiment of the present invention, in which the allowed actual driving torque range is defined by a maximum limit and a minimum limit (trqLimGradMax and trqLimGradMin) for the gradient (first derivative) of the characteristic of an actual driving torque 211 (trq). A PT1 response is again assumed. FIG. 5 shows element 1, representing the setpoint driving torque (trqDes) (known from FIG. 1) connected to a node 175 via a connection 174. A connection 176 leads from node 175 to an input 177 of a subtractor 178, in which actual driving torque (trq) is subtracted from setpoint driving torque (trqDes). A connection 180 leads from an output 179 of subtractor 178 to an input 181 of an element 182 in which allowed changes trqMaxDelta and trqMinDelta for actual driving torque 211 between two sampling steps have been calculated from the limits for the allowed gradient (first derivative) of actual driving torque 211 by multiplication by quantity dT characterizing the sampling time (sampling period, time between two calculation cycles). Limits trqLimGradMax and trqLimGradMin for the allowed gradient (first derivative) of actual driving torque 211 are ascertained in the sense of a PT1 response from the difference between setpoint driving torque (trqDes) and actual driving torque (trq) applied to output 179 of subtractor 178. Allowed changes trqMaxDelta and trqMinDelta are each sent via two outputs 183 and 184 of element 182 over one connection 185 and 186 each to two inputs 187 and 188 of an element 189. For example, for an increasing actual driving torque 211 (trq) it holds that:

$$trqLimGrad\text{Min} \leq d(trq)/dt \leq trqLimGrad\text{Max}$$

where:

$$trqLimGrad\text{Max} = (trqDes - trq)/(TPT1\_\text{Fast})$$

$$trqLimGrad\text{Min} = (trqDes - trq)/(TPT1\_\text{Slow})$$

From node 175, another connection 190 leads to control unit 3 known from FIG. 1, from which a connection 191 leads to internal combustion engine 5 known from FIG. 1 and another connection 192 leads to another input 193 of element 189. A connection 194 leads from internal combustion engine 5 to a node 195, from which a connection 196 leads to another input 197 of element 189, and another connection 198 leads to an input 199 of an adder 200. In element 189, the change in setpoint torque 16 of electric machine 7 is limited between two samplings, taking into account an actual torque change in internal combustion engine 5 between two samplings via trqMaxDelta and trqMinDelta from element 182.

From an output 201 of element 189, the limited setpoint torque of electric machine 7 is sent over a connection 202 to electric machine 7, from which another connection 203 carries the actual torque of electric machine 7 to another input 204 of adder 200, in which the torques of electric machine 7 and internal combustion engine 5 are added. From an output 205 of adder 200, a connection 206 leads to a node 207, from which a connection 208 carries actual driving torque 211 as the subtrahend to another input 209 of subtractor 178 and is situated as the output quantity via a connection 210 at node 207.

Again in this exemplary embodiment, the ratio of the actual torque predefined by control unit 3 to the setpoint torque of the electric machine is as depicted in FIG. 4, in that the actual torque initially increases due to the limitation and only then approaches the setpoint torque. Likewise, actual driving torque 211 of the entire drivetrain behaves like actual driving torque 167 depicted in FIG. 3. Here again, undershooting is prevented by an additional torque from electric machine 7. This gradient-based method is suitable in particular in conjunction with a guide shaping for load knock damping. With a corresponding guide shaping, the gradient of actual driving torque 211 is limited in the range of the zero crossing (e.g., in transition from push to pull operation).

What is claimed is:

1. A method for operating a hybrid drive system of a motor vehicle having an internal combustion engine and at least one electric machine, comprising:
   at least partially compensating, by operating the electric machine, for a delay in change of torque due to inertia in torque triggering of the internal combustion engine in response to a request for a specified torque;
   wherein a torque component of the specified torque not deliverable by the internal combustion engine due to inertia in torque triggering of the internal combustion engine is at least partially compensated by a torque component delivered by the electric machine;
   wherein the internal combustion engine can be in a state where it is turbocharged or non-turbocharged; and
   an actual driving torque is a total of the torque component of the internal combustion engine and the torque component of the electric machine, wherein after the at least partial compensation is applied, the electric machine supplies an additional torque contribution on leaving an allowed range for the actual driving torque in order to return to the allowed range.

2. The method as recited in claim 1, further comprising:
   depending on requirements of the request for the specified torque, predefining the allowed range for at least one of the actual driving torque and a gradient of the actual driving torque as a function of at least one parameter.

3. The method as recited in claim 2, wherein the allowed range for the actual driving torque is predefined in such a way that vibration excitations of a drive-train of the hybrid vehicle are prevented.

4. The method as recited in claim 2, wherein the power of the electric machine is predefined within specified limits to reduce conversion losses occurring during operation of the electric machine.

5. The method as recited in claim 2, wherein at least one range limit of the allowed range for the actual driving torque is influenced by the power of the electric machine, and wherein the power of the electric machine is predefined within specified limits.

6. The method as recited in claim 2, wherein the at least one parameter is defined as a function of at least one of: a) a cruise control system; b) an adaptive cruise control system; c) a velocity of the internal combustion engine; d) a rotational speed of the internal combustion engine; e) an ESP system; f) an ASR system; g) an ABS system; and h) an individual driver setting.

7. The method as recited in claim 1, further comprising:
   depending on requirements of the request for the specified torque, predefining an allowed range for at least one of the actual driving torque and a gradient of the actual driving torque as a function of at least one parameter;
   wherein the allowed range for the actual driving torque is predefined in such a way that vibration excitations of a drive-train of the hybrid vehicle are prevented.

8. The method as recited in claim 7, wherein the power of the electric machine is predefined within specified limits to reduce conversion losses occurring during operation of the electric machine.

9. The method as recited in claim 7, wherein at least one range limit of the allowed range for the actual driving torque is influenced by the power of the electric machine, and wherein the power of the electric machine is predefined within specified limits.

10. The method as recited in claim 7, wherein the electric machine supplies an additional torque contribution on leaving the allowed range for the actual driving torque.

11. The method as recited in claim 7, wherein the at least one parameter is defined as a function of at least one of: a) a cruise control system; b) an adaptive cruise control system; c) a velocity of the internal combustion engine; d) a rotational speed of the internal combustion engine; e) an ESP system; f) an ASR system; g) an ABS system; and h) an individual driver setting.

12. The method as recited in claim 11, wherein at least one range limit of the allowed range for the actual driving torque is influenced by the power of the electric machine, and wherein the power of the electric machine is predefined within specified limits, and wherein the electric machine supplies an additional torque contribution on leaving the allowed range for the actual driving torque.

13. The method as recited in claim 11, wherein the power of the electric machine is predefined within specified limits to reduce conversion losses occurring during operation of the electric machine, and wherein at least one range limit of the allowed range for the actual driving torque is influenced by the power of the electric machine, and wherein the power of the electric machine is predefined within specified limits.

14. The method as recited in claim 7, wherein at least one range limit of the allowed range for the actual driving torque is influenced by the power of the electric machine, and wherein the power of the electric machine is predefined within specified limits, and wherein the electric machine supplies an additional torque contribution on leaving the allowed range for the actual driving torque.

15. The method as recited in claim 7, wherein the power of the electric machine is predefined within specified limits to reduce conversion losses occurring during operation of the electric machine, and wherein at least one range limit of the allowed range for the actual driving torque is influenced by the power of the electric machine, and wherein the power of the electric machine is predefined within specified limits.

16. A control device for operating a hybrid drive system of a motor vehicle having an internal combustion engine and at least one electric machine, comprising:
an arrangement configured to control triggering of the electric machine to at least partially compensate for a delay in change of torque due to inertia in torque triggering of the internal combustion engine in response to a request for a specified torque, wherein a torque component of the specified torque not deliverable by the internal combustion engine due to inertia in torque triggering of the internal combustion engine is at least partially compensated by a torque component delivered by the electric machine wherein the internal combustion engine can be in a state where it is turbocharged or non-turbocharged; and an actual driving torque is a total of the torque component of the internal combustion engine and the torque component of the electric machine, wherein after the at least partial compensation is applied, the electric machine supplies an additional torque contribution on leaving the allowed range for the actual driving torque in order to return to the allowed range.

17. The device as recited in claim 16, wherein depending on requirements of the request for the specified torque, an allowed range is predefined for at least one of the actual driving torque and a gradient of the actual driving torque as a function of at least one parameter.

18. The device as recited in claim 17, wherein the allowed range for the actual driving torque is predefined in such a way that vibration excitations of a drive-train of the hybrid vehicle are prevented.

19. The device as recited in claim 17, wherein the power of the electric machine is predefined within specified limits to reduce conversion losses occurring during operation of the electric machine.

20. The device as recited in claim 17, wherein at least one range limit of the allowed range for the actual driving torque is influenced by the power of the electric machine, and wherein the power of the electric machine is predefined within specified limits.

21. The device as recited in claim 17, wherein the electric machine supplies an additional torque contribution on leaving the allowed range for the actual driving torque.

22. The device as recited in claim 17, wherein the at least one parameter is defined as a function of at least one of: a) a cruise control system; b) an adaptive cruise control system; c) a velocity of the internal combustion engine; d) a rotational speed of the internal combustion engine; e) an ESP system; f) an ASR system; g) an ABS system; and h) an individual driver setting.

* * * * *

UNITED STATES PATENT AND TRADEMARK OFFICE
CERTIFICATE OF CORRECTION

PATENT NO. : 8,720,619 B2 Page 1 of 1
APPLICATION NO. : 12/223201
DATED : May 13, 2014
INVENTOR(S) : Jens-Werner Falkenstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1626 days.

Signed and Sealed this

Twenty-ninth Day of September, 2015

Michelle K. Lee
*Director of the United States Patent and Trademark Office*